INVENTOR
Philip J. Martin
BY Redgemond A. Parker ATTORNEY

P. J. MARTIN.
INTERNAL COMBUSTION ENGINE.
APPLICATION FILED APR. 24, 1916.

1,257,268.

Patented Feb. 19, 1918.
6 SHEETS—SHEET 4.

INVENTOR
Philip J. Martin
By Raymond A. Packer ATTORNEY

UNITED STATES PATENT OFFICE.

PHILIP J. MARTIN, OF DETROIT, MICHIGAN.

INTERNAL-COMBUSTION ENGINE.

1,257,268.      Specification of Letters Patent.    Patented Feb. 19, 1918.

Application filed April 24, 1916. Serial No. 93,083.

*To all whom it may concern:*

Be it known that I, PHILIP J. MARTIN, a citizen of the United States, residing at Detroit, county of Wayne, State of Michigan, have invented a certain new and useful Improvement in Internal - Combustion Engines, and declare the following to be a full, clear, and exact description of the same, such as will enable others skilled in the art to which it pertains to make and use the same, reference being had to the accompanying drawings, which form a part of this specification.

My invention relates to internal combustion engines and objects of my improvements are to provide an improved rotary engine of the internal combustion type and one in which the charge is compressed before each explosion and in which at least one working impulse may occur at each revolution.

I attain these objects in the device illustrated in the accompanying drawings in which.

Figure 5:
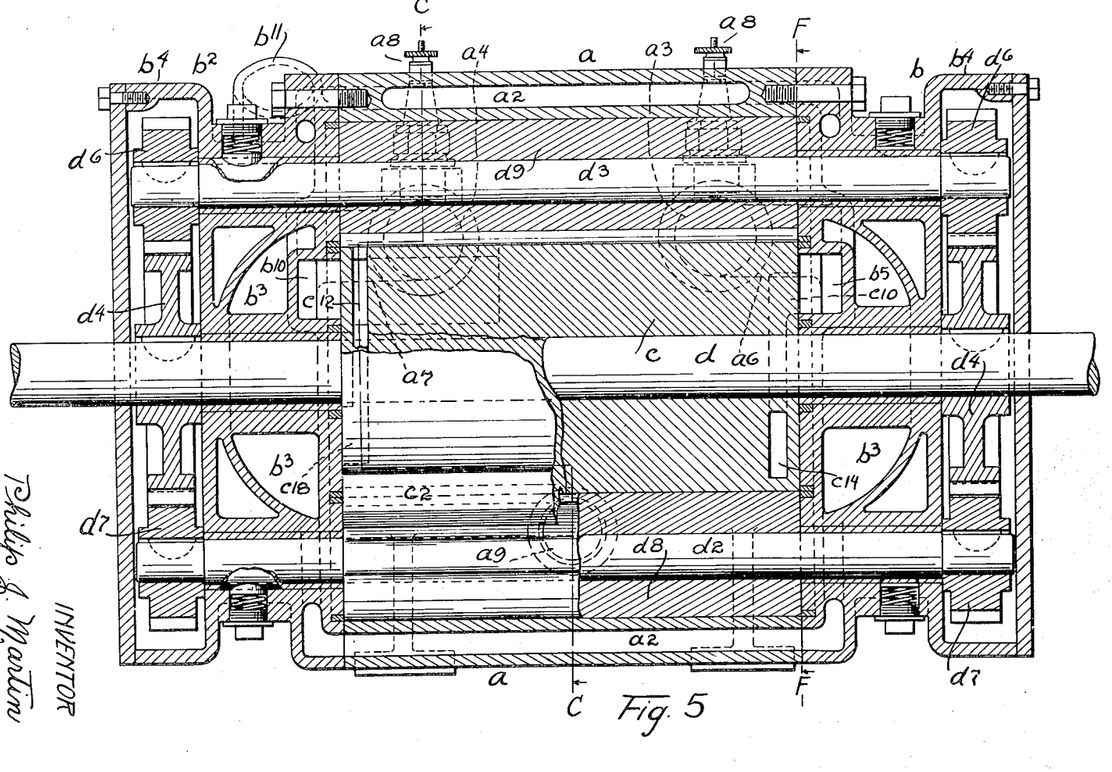
Fig. 5 is a longitudinal section on the line E—E—E—E—E—E, Fig. 3, looking from the left of said line as indicated by the arrows.

The main operative parts of the motor are the casing $a$, the two end pieces $b$ $b^2$, the rotor $c$ mounted upon a shaft $d$ which shaft rests in bearings, concentric with the casing, in the end pieces $b$ $b^2$ and having blades, wings or pistons $c^2$ $c^3$, the outer surfaces of which engage the cylindrical bore of the casing $a$ and move in contact therewith, and the rotor abutments or rotary valves $d^8$ $d^9$ mounted upon shafts $d^2$ $d^3$ which turn in bearings in the end pieces $b$ $b^2$ parallel to the shaft $d$, their peripheries moving in contact with the periphery of the rotor $c$ and being cut away to permit the passage of the blades or pistons $c^2$ $c^3$ in close engagement therewith. The rotor and the valves $d^8$ $d^9$ are connected to move in unison by trains of spur gear wheels $d^4$ $d^6$ $d^7$ in casings $b^4$ (Fig. 5).

The parts are cooled by water circulation, and I have indicated water passages $a^2$ in the casing $a$, and $b^3$ in the two end pieces $b$ $b^2$. The water enters at $b^{11}$ in the end piece $b^2$ passes through passages $b^3$ into the passages $a^2$ and is discharged through an opening $b^{12}$ in the other end piece.

$a^3$ $a^4$ are chambers formed in projections from the casing $a$ and made adjustable by the screw plugs $a^5$ $a^5$ closing the outer ends of said chambers. The chambers $a^3$ $a^4$ are the compression and explosion chambers and they are provided with spark plugs $a^8$ $a^8$ adapted to ignite the explosion mixture therein. $a^6$ is a passage leading from the explosion chamber $a^3$ and opening at the end surface of the casing $a$ which is contiguous to the end piece $b$, and $a^7$ is a similar passage leading from the explosion chamber $a^4$ to the end of the casing $a$ which is contiguous to the end piece $b^2$.

Figure 3:
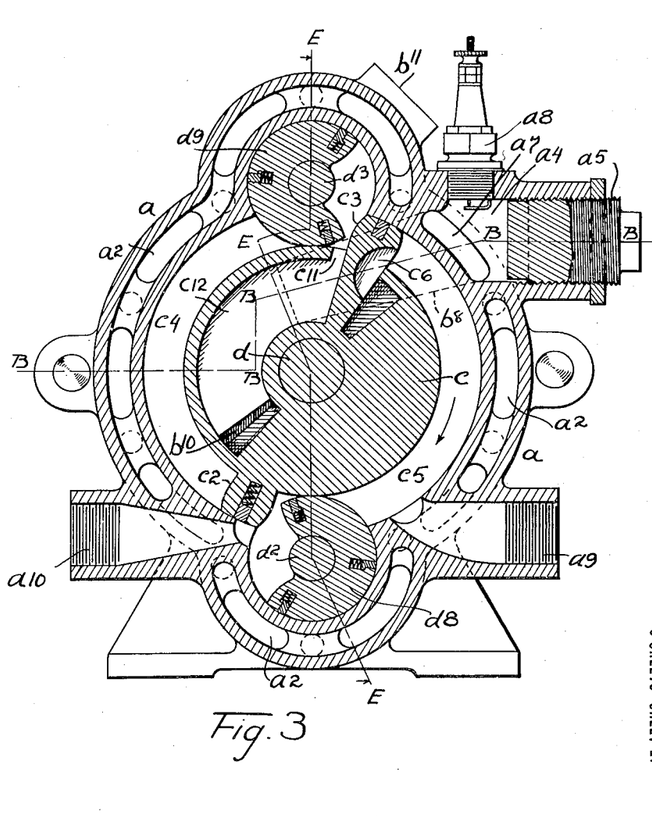
Fig. 3 is a section on the line C—C—C—C, Figs. 2 and 5, looking from the right of the section line, as indicated by the arrows, the rotor ports being in the position they occupy at the commencement of a working impulse.

$a^9$ is an exhaust passage and $a^{10}$ an intake passage formed in the casing $a$ (Fig. 3).

The end piece $b$ (Figs. 2, 5 and 10) is secured against the right hand end surface of the casing $a$ so that its inner surface shall make a close fitting contact with the rotor $c$. $b^5$ is a passage cored in the end piece $b$ turning at one end and registering at $b^6$ with the passage $a^6$ thus forming a communication between the explosion chamber $a^3$ and the passage $b^5$.

Figure 4:
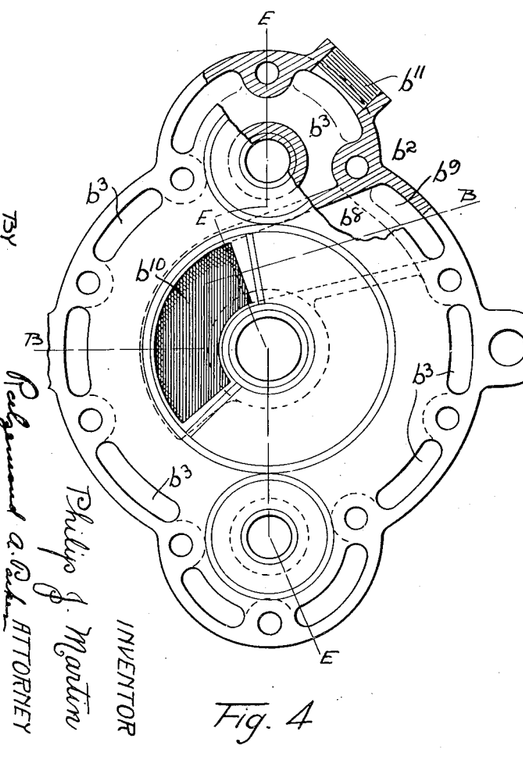
Fig. 4 is a view of the end plate which is remote from the observer in Fig. 3 and is at the left of Figs. 1, 2 and 5 looking at its inner space, the plate being removed from the engine casing.
Figure 10:
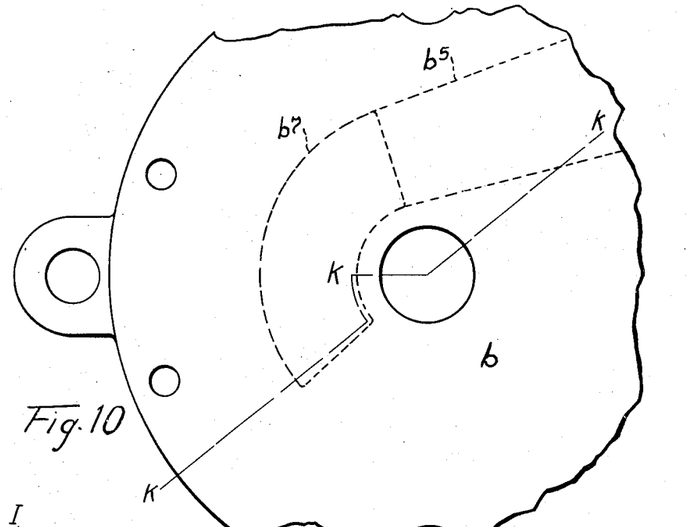
Fig. 10 is a view of a part of the cover at the right of Figs. 1, 2 and 5 partly broken away and drawn to the same scale as Fig. 9, the ports and passages being shown in dotted lines and in their relative angular position to the port and passages shown in Fig. 9.
Figure 11:
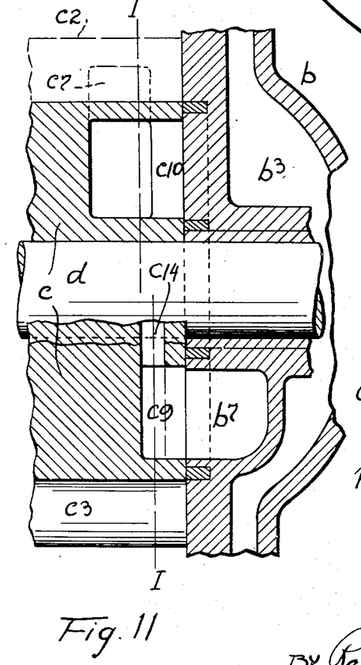
Fig. 11 is a detail sectional view of the right hand end of the rotor and part of the right hand cover to the same scale as in Figs. 9 and 10, the section being taken on the line K—K Fig. 9 looking from the left and above said line.

At the end of the passage $b^5$ remote from the explosion chamber $a^3$ it communicates with a groove, or cavity, $b^7$ (Figs. 2 and 10), which cavity is a depression in the inner surface of the end piece $b$ and has the extent and form indicated in dotted lines in Fig. 10, and shown in Fig. 4 with reference to the similar cavity $b^{10}$ in the end piece $b^2$.

The end piece $b^2$ as shown in Fig. 4 has a similar construction to the end piece $b$. The indentation or groove $b^{10}$ corresponding to $b^7$ in the end piece $b$ and the passages $b^8$ and $b^9$ correspond, respectively, to the passages $b^5$ and $b^6$ in the end piece $b$. The passage $b^9$ registers with the passage $a^7$ communicating with the explosion chamber $a^4$ and putting said chamber into communication with the groove, or cavity, or indentation $b^{10}$ in the inner surface of the end piece $b^2$ just as above described with reference to the corresponding passages $b^6$ $a^6$ and cavity $b^7$.

The rotor $c$ turns in a cylindrical bore in the casing $a$ and is provided with blades, wings or pistons $c^2$ $c^3$ extending radially outward from its periphery and filling the cross-section of the annular space $c^4$ $c^5$ between the periphery of the rotor and the inner wall of the casing engaging against the interior surface of the end pieces $b$ $b^2$ at their ends. There are ports $c^9$ $c^{10}$ opening from the right hand end of the rotor $c$ within the periphery of said rotor and in such position that they register with the groove or hollow $b^7$ formed in the inner surface of the end piece $b$ while passing through the angular distance subtended by such groove.

The port $c^{10}$ is located a little in advance of the piston, or wing, $c^3$ and communicates with a passage, or conduit, $c^{14}$ which extends parallel and adjacent, to this end of the rotor and from near the piston $c^3$ to a position adjacent to the other wing, or piston, $c^2$ at which point it opens in an elongated slot $c^{13}$ through the periphery of the rotor just back of the piston $c^2$. The other port $c^9$ extends in a groove $c^7$, in the piston, or wing, $c^2$ to the exterior of the rotor and the space $c^4$ between the rotor and inner wall of the casing $a$.

Upon the opposite end of the rotor $c$ are located ports $c^8$ $c^{18}$ corresponding, respectively, to the ports $c^9$ and $c^{10}$ but located angularly at 180 degrees to such corresponding ports, so that the port $c^8$ is opposite the port $c^{10}$ and the port $c^{18}$ is opposite the port $c^9$. The ports and the passages $c^6$ $c^{12}$ and $c^{11}$ at this end of the rotor correspond to the similar ports and passages formed at the other end of the rotor.

Figures 6, 7, 8:
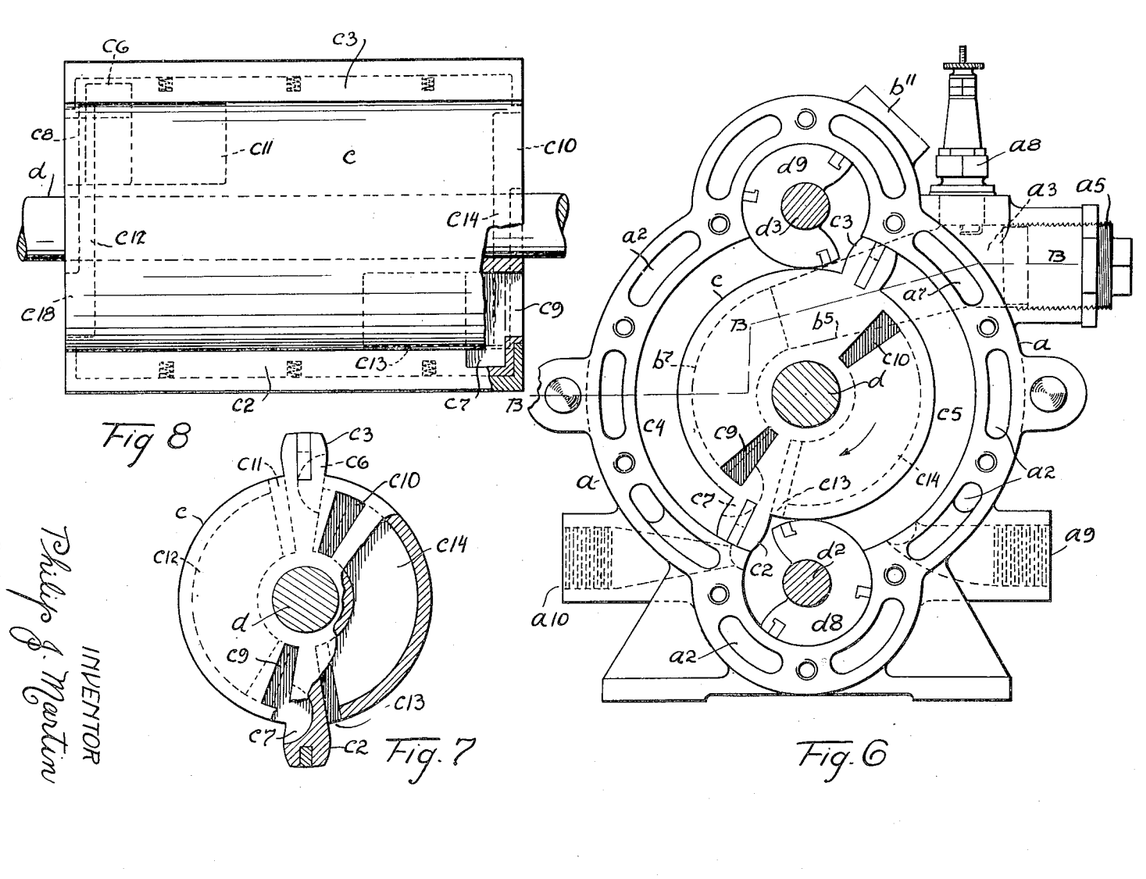
Fig. 6 is an end elevation of the apparatus shown in Fig. 1 with the end plate removed, the elevation being in the plane indicated by the lines F—F in Figs. 1, 2 and 5, looking from the right of said line as shown by the arrows, some of the ports and passages in the removed cover being indicated by dotted lines and the rotor ports being shown in the position they occupy at the commencement of compression.
Fig. 7 is an end elevation looking from the right of Fig. 8 of the rotor, partly broken away to indicate passages therein.
Fig. 8 is a plan view of the rotor partly broken away to show internal passages.

The operation of the above described device is as follows:

In the position of the rotor $c$ shown in Figs. 1 to 8 of the drawings an explosion, or working, impulse is just commencing, utilizing the passages and explosion chamber $a^4$ at the left, and the compression is just commencing utilizing the passages and compression chamber $a^3$ at the right, as shown most distinctly in Figs. 3 and 6.

Figure 1:
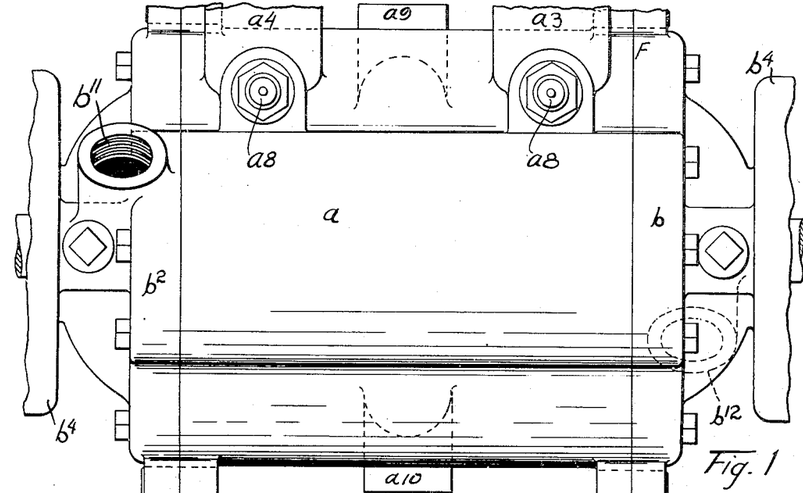
Figure 1 is a plan view of an engine embodying my invention.
Figure 2:
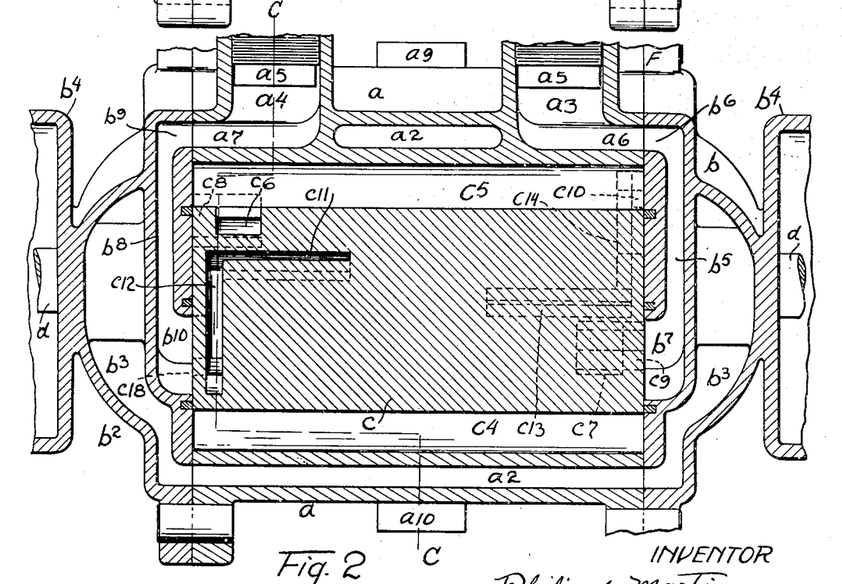
Fig. 2 is a section thereof on the lines indicated by the letters B—B—B—B—B, Fig. 3.

The compression is accomplished as follows referring to Figs. 2 and 6:

The port $c^9$ having come into register with the groove or hollow $b^7$ in the inner surface of the end piece $b$ and the wing or piston $c^2$ as illustrated in Fig. 6 compressing the explosion mixture before it in the annular space $c^4$, the gases thus being compressed pass from the passage $c^4$ through $c^7$ to the port $c^9$ in the rotor and, from thence, into the hollow, groove, or cavity, $b^7$ in the end piece $b$ and then through the passages $b^5$ $b^6$ $a^6$ to the explosion chamber $a^3$. When the port $c^9$ has passed angularly beyond the groove $b^7$, it is closed by the inner wall of the end piece $b$, as is also the groove or hollow $b^7$.

Figure 9:
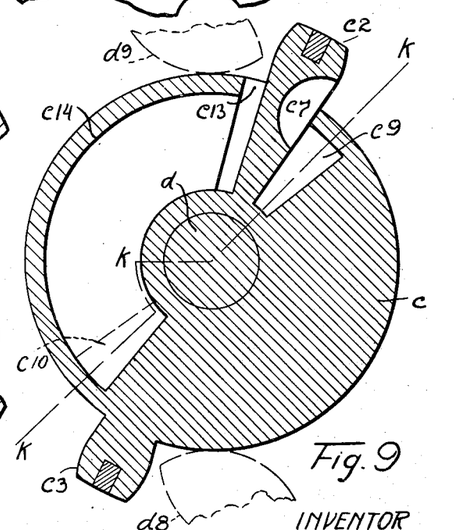
Fig. 9 is a sectional elevation of the rotor, the section being taken through the right hand end of the rotor at right angles to its axis, as indicated by the line I—I in Fig. 11.

With the further movement of the rotor, the wing or piston $c^3$ passes by the valve $d^8$ and the port $c^{10}$ now begins to register with the groove or hollow $b^7$ in the end piece $b$ with the slot $c^{13}$ opening to the periphery of the rotor just behind the wing or piston $c^2$ and between such piston and the valve $d^9$ as illustrated in Fig. 9. Comparing Fig. 9 with Fig. 10 it will be understood that the port $c^{10}$ has just begun to register with the port $b^7$ indicated in dotted lines in Fig. 10.

Now the explosive mixture which has been compressed in the chamber $a^3$ is ignited and the flame, and pressure consequent on the heating of the gases, is propagated from the explosion chamber $a^3$ through the passage $b^5$ to the groove or depression $b^7$ then through the port $c^{10}$, passage $c^{14}$ and opening $c^{13}$ therefrom to the space between the wing or piston $c^2$ and the valve $d^9$, the latter being shown in dotted lines in Fig. 9, and the relative position of the passage and parts indicated. The ignited charge acts by its pressure upon the wing or piston $c^2$ to force it through the annular passage $c^5$ communicating power to the rotor $c$, and the burned gases are subsequently discharged through the exhaust passage $a^9$.

As a wing or piston $c^2$ or $c^3$ passes from a position adjacent to the valve $d^8$ to the valve $d^9$ a fresh charge of explosive mixture is thereby drawn in through the port $a^{10}$, which is subsequently compressed and fired as above described.

It will be observed that compression, ignition and expansion occurs at each revolution upon this end of the motor.

As above said, the parts and passages at the other end of the motor are the same as just described except that they are located at an angle of 180 degrees. Thus, there are two working strokes at each revolution of the rotor.

Comparing the operation at the left hand end of the motor with that just described for the right hand end. While the compression is taking place at the right hand end of the motor as above described, at the left hand end the port $c^{18}$ Figs. 2, 3 and 4 is just beginning to register with the groove or cavity $b^{10}$ in the end piece $b^2$ and the explosion is just taking place in the chamber $a^4$, the pressure passing through the passages $a^7$ $b^8$ $b^{10}$, the port $c^{18}$, the passage $c^{12}$ and the slot $c^{11}$, in the periphery of the motor, between the wing or piston $c^3$ and the valve $d^9$ thus causing the pressure to act upon the piston $c^3$ driving it through the annular passage $c^5$ for its working stroke.

As soon as this stroke has been accomplished the wing or piston $c^3$ passes by the valve $d^8$, the explosive mixture which has been drawn in behind the piston $c^2$ is compressed and passes through the passage $c^6$ $c^8$ into the groove or cavity $b^{10}$ through the passages $b^8$ $b^9$ $a^7$ into the explosion chamber $a^4$. The compression at this end of the motor taking place while the working impulse is occurring at the other end as above described.

It will be seen that the wings $c^2$ $c^8$ are provided at opposite ends of the rotor with similar passages $c^6$ and $c^7$.

Explosion and compression take place alternately at the ends and explosive mixture is drawn in behind each of the two pistons $c^2$ $c^8$ as it passes from the bottom to the top of the casing and the exhaust is forced out ahead of each of said pistons as it passes from the top to the bottom of the casing.

The degree of compression can be regulated by adjusting the screw-threaded plug $a^5$ to contract or expand the volume of the compression chambers $a^3$ $a^4$.

Figure 12:
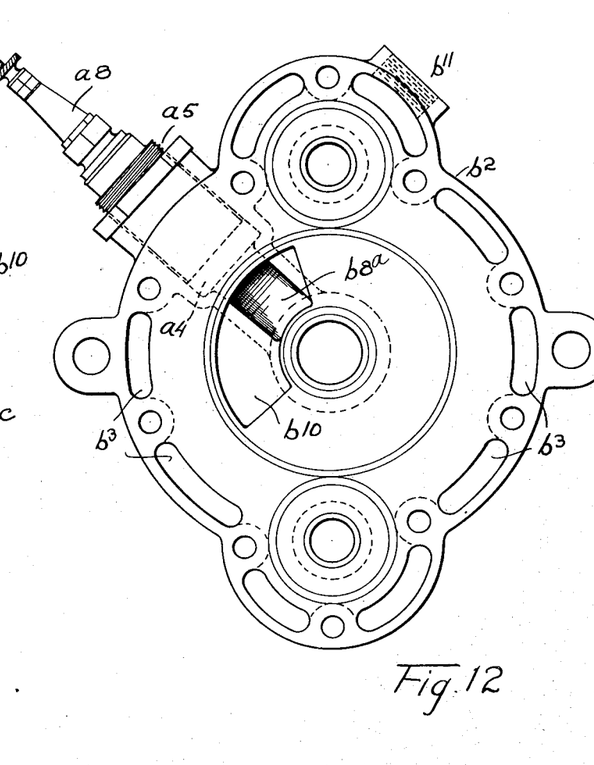
Fig. 12 is an inside elevation of an end plate having a modified construction from that shown in the other figures.
Figure 13:
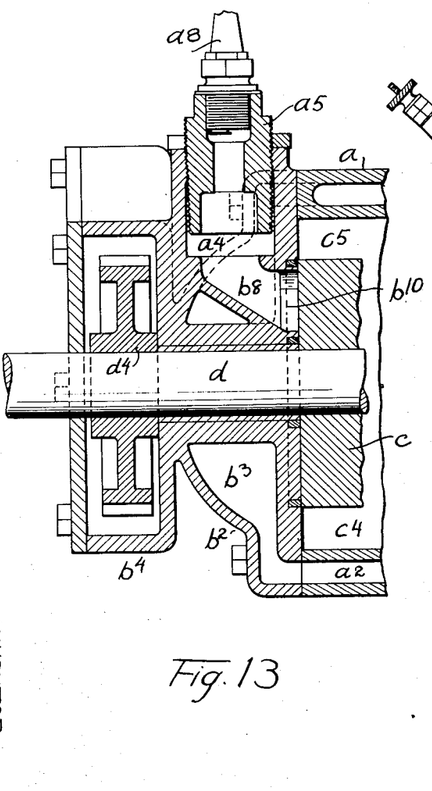
Fig. 13 is a sectional view of the cover shown in Fig. 12 with adjacent portions of the casing and rotor.

I have shown the explosion chambers $a^3$ $a^4$ as formed in the casing and lying tangentially thereto, but it is obvious that such explosion chambers may be formed in the end pieces and extend radially thereto as shown in Figs. 12 and 13 where $b^{8a}$ corresponds to the passages $b^8$ $b^9$ and $a^7$, such passage forming a direct connection between the groove or depression $b^{10}$ and the explosion chamber $a^4$ instead of the indirect connection above described. The construction of the rotor will obviously be the same in this case.

While I have described the engine for convenience as having separate end pieces of course this is a mere structural detail and this description serves to distinguish the ends of the casing.

What I claim is:

1. In an engine, a casing, a rotor and coacting parts in said casing adapted to compress a gaseous charge for part of its rotation and expand a gaseous charge for another part of its rotation, an inclosed chamber, means for igniting the gas in said chamber, passages and ports at the end of said rotor adapted to be connected and disconnected by the rotation of said rotor so as to connect said chamber with the space in which the gaseous charge is expanded for the working stroke, and to connect the same with the space in which the gaseous charge is compressed for the compression stroke.

2. In an engine, the combination of a casing, a rotor therein having a piston extending from its periphery, valves adapted to coact with said rotor and pistons, an end piece to said casing engaging against the end of said rotor, two ports opening to the end of said rotor within its periphery, one of said ports being located in front of said piston and opening immediately to the periphery of the rotor, the other port being located at an angular distance from the first named piston and opening by means of passages in said rotor to the periphery of the latter port behind said piston, a groove or hollow in said end piece located so that said ports shall register therewith, an inclosed chamber communicating with said groove, the arrangement being substantially as and for the purpose described.

3. In an engine, the combination of a casing, a rotor therein having two pistons extending from its periphery, two valves adapted to coact with said rotor and pistons, end pieces on said casing engaging against the ends of said rotor, two ports opening to each end of said rotor within its periphery, one of said ports being located in front of one of said pistons and the other of said ports being located in front of the other of said pistons, one of said ports opening to the periphery of said rotor just ahead of the piston adjacent to which it is located and the other of said ports opening to the periphery of said rotor at a point just behind the piston remote from that adjacent to which it is located, a groove or hollow in each of said end pieces adapted to register with the ports in the end of said rotor, and an inclosed chamber communicating with said groove, the arrangement being substantially as shown and for the purpose described.

4. In an engine, the combination of a casing, a rotor therein having a piston extending from its periphery, valves adapted to coact with said rotor and pistons, an end piece to said casing engaging against the end of said rotor, two ports opening to the end of said rotor within its periphery, one of said ports being located in front of said piston and opening immediately to the periphery of the rotor, the other port being located at an angular distance from the first named piston and opening by means of passages in said rotor to the periphery of the latter port behind said piston, a groove or hollow in said end piece located so that said ports shall register therewith, an inclosed chamber communicating with said groove, an intake port adjacent to one of said valves on the side thereof from which the piston moves away from the valve, and an exhaust port on the side of said valve toward which the piston moves, the arrangement being substantially as and for the purpose described.

5. In an engine, the combination of a casing, a rotor therein having two pistons extending from its periphery, two valves adapted to coact with said rotor and pistons, end pieces on said casing engaging against the ends of said rotor, two ports opening to each end of said rotor within its periphery, one of said ports being located in front of one of said pistons and the other of said ports being located in front of the other of said pistons, one of said ports opening to the periphery of said rotor just ahead of the piston adjacent to which it is located and the other of said ports opening to the periphery of said rotor at a point just behind the piston remote from that adjacent to which it is located, a groove or hollow in each of said end pieces adapted to register with the ports in the end of said rotor, and an inclosed chamber communicating with said groove, an intake port adjacent to one of said valves on the side thereof from which the piston moves away from the valve, and an exhaust port on the side of said valve toward which the piston moves, the arrangement being substantially as shown and for the purpose described.

6. In an engine, the combination of a casing, a rotor therein having a piston extending therefrom, a valve adapted to coact with said rotor and piston, said piston engaging walls of said casing so as to form an inclosed space with said valve rotor and casing, a cavity in said casing normally separated by said rotor from said inclosed space, ports in said rotor adapted to register with said cavity, one of said ports being located ahead of said piston adjacent thereto and communicating immediately with said space, the other of said ports being located at a distance from the first named port and communicating with said space back of said piston and adjacent thereto.

7. In an engine, the combination of a casing, a rotor therein having a piston extending therefrom, a valve adapted to coact with said rotor and piston, said piston engaging walls of said casing so as to form an inclosed space with said valve, rotor and casing, a cavity in said casing normally separated by said rotor from said inclosed space, ports in said rotor adapted to register with said cavity, one of said ports being located ahead of said piston adjacent thereto and communicating immediately with said space, the other of said ports being located at a distance from the first named port and communicating with said space back of said piston and adjacent thereto, means for exhausting gas from said casing, and means for drawing a charge of gas into said casing.

8. In an engine, the combination of a casing, a rotor therein having two pistons extending therefrom, two valves adapted to coact with said rotor and piston, said pistons engaging the walls of said casing so as to form an inclosed space with said valves, rotor and casing, two cavities in said casing separated by said rotor from said inclosed space, a pair of ports in said rotor adapted to register with each of said cavities, one of the ports of each pair being located ahead of one of said pistons adjacent thereto and communicating immediately with said space, the other port of said pair being located at a distance from the first named port and communicating with said space back of said pistons and adjacent thereto.

9. In an engine, the combination of a casing, a rotor therein having two pistons extending therefrom, two valves adapted to coact with said rotor and piston, said pistons engaging the walls of said casing so as to form an inclosed space with said valves rotor and casing, two cavities in said casing separated by said rotor from said inclosed space, a pair of ports in said rotor adapted to register with each of said cavities, one of the ports of each pair being located ahead of one of said pistons adjacent thereto and communicating immediately with said space, the other port of said pair being located at a distance from the first named port and communicating with said space back of said pistons and adjacent thereto, an intake port adjacent to one of said valves on the side thereof from which the piston moves away from the valve, and an exhaust port on the side of said port toward which the piston moves for the purpose described.

In testimony whereof, I sign this specification.

PHILIP J. MARTIN.